3,542,709
METHOD FOR PREPARING A POLYURETHANE ELASTOMER SOLUTION
Seiji Kazama, Suita, Osaka, and Masamitsu Nakabayashi, Ibaraki, Osaka, Japan, assignors to Takeda Chemical Industries, Ltd., Osaka, Japan
No Drawing. Filed Apr. 4, 1969, Ser. No. 813,698
Claims priority, application Japan, Apr. 8, 1968, 43/23,222
Int. Cl. C08g 22/06, 22/40
U.S. Cl. 260—22       7 Claims

ABSTRACT OF THE DISCLOSURE

Polyurethane elastomer solution useful as finishing agent for fibrous materials is prepared by allowing a polyester diol of molecular weight ranging from 500 to 1,500, a compound of the formula

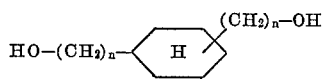

(wherein $n$ is 0, 1 or 2, and the one HO—$(CH_2)_n$-group attaches to the cyclohexyl ring at para- or meta-position relative to the other HO—$(CH_2)_n$-group) in an amount of 0.5 to 3 mole parts per mole of the polyester diol and $\omega,\omega'$-diisocyanate dimethylbenzene in an amount of 0.475 to 0.55 mole per OH group in the polyester diol and the compound of the above formula to react with one another in the presence of tetrahydrofuran, cyclohexanone, dioxane, methylethyl ketone, methyl acetate, or a mixture of two or more thereof in such an amount that a weight ratio of the solvent to the reactants falls within 40:60 to 70:30, and diluting the resultant with one or more of the above-mentioned solvents so as to adjust the polymer content of the resultant to 15 to 30 weight percent.

---

The present invention is concerned with a method for preparing a polyurethane elastomer solution useful for a finishing agent of fibrous materials.

It has been known that fibrous materials such as woven fabrics and non-woven fabrics are treated with a resin solution to manufacture waterproof cloths, leatherlike cloths and other processed cloths. It has further been known that various kinds of synthetic leathers based on polyvinyl chloride resin, nylons and the like are coated with an elastomeric substance to improve their strength, abrasion resistance, luster, touch and other properties.

When a polyurethane elastomer is used for this purpose, so-called one-can type elastomer solution is desirably practised, since two-can type elastomer solution has such drawbacks that it shows only a short pot-life after admixing the two components with each other and coating film produced therefrom remains tacky for a rather long period of time.

Hithertofore, as one-can type polyurethane elastomer for this purpose, only that derived from 4,4'-diphenylmethane diisocyanate (MDI) has actually been put into practical use.

However, this MDI-based polyurethane elastomer has such a serious defect that a coating layer derived therefrom is colored on exposure to light or heat.

The present inventors had, at first, thought of using $\omega,\omega'$-diisocyanate dimethyl benzene (XDI) in place of MDI for obviating this defect, but reached a finding that, when XDI is intended to use in place of MDI, there remain the problems to be solved as mentioned below.

A film or layer coated on a surface of fibrous materials is required to have excellent mechanical and other physical properties, particularly, a high softening temperature (not lower than about 120° C.). And we have found that XDI-based polyurethane elastomer capable of producing a coating film having a high softening temperature and other excellent physical properties, which are prepared by a conventional manner, are not soluble in a conventional solvent such as ketones, ethers, and esters etc., but soluble only in such limited specific solvents as dimethylformamide, dimethylsulfoxide and dimethylacetamide.

However, an XDI-based polyurethane elastomer solution in one of the above mentioned specific solvents can not be put into practical use because of the following reasons: namely, the above-mentioned solvents are very toxic to human body; they have a rather high boiling point and therefore require heating at high temperature for preparing a coating film on the surface of fibrous materials by evaporating the solvent, which not only leads to a poor processability but also causes a serious degradation of the fibrous materials; and further the elastomer solution and/or the coating film derived therefrom becomes turbid due to a high hygroscopicity of the solvent.

We have further found that, when an XDI-based polyurethane elastomer soluble in a conventional solvent such as ketones, esters, and ethers is intended to produce, a softening temperature and other physical properties of the coating film derived therefrom must necessarily be sacrificed, in other words, the coating film derived from the elastomer soluble in the conventional solvent, which is prepared by the per se known manner, shows a low softening temperature and other poor physical properties.

Thus, we have extensively studied for a method for preparing an XDI-base polyurethane elastomer, which is soluble in a conventional solvent and shows a high softening temperature and other excellent physical properties, to reach the present invention.

The principal object of the present invention is to provide an XDI-base polyurethane elastomer solution in a conventional solvent, which can easily produce a coating film having a high anti-coloring property, a high softening temperature and other excellent properties on the surface of fibrous materials.

The other object is to provide a method for preparing the above stated XDI-base polyurethane elastomer solution in a conventional solvent.

Thus, the present invention relates to a method for preparing an XDI-base polyurethane elastomer solution, which comprises allowing a polyester diol of molecular weight ranging from 500 to 1500, a compound of the formula

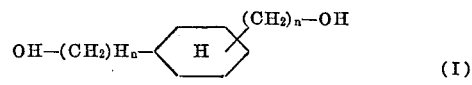
(I)

(wherein $n$ is 0, 1 or 2, and the one HO—$(CH_2)_n$-group attaches to the cyclohexyl ring at para- or meta-position relative to the other HO—$(CH_2)_n$-group.) in an amount of 0.5 to 3 mole parts per mole of the polyester diol and $\omega,\omega'$ - diisocyanate dimethyl benzene in an amount of 0.475 to 0.55 mole per OH group in the polyester diol and the compound of the above formula to react with one another in the presence of tetrahydrofuran, cyclohexanone, methylethyl ketone, methyl acetate, dioxane or a mixture of two or more thereof in such an amount that a weight ratio of the solvent to the reactants falls within 40:60 to 70:30 and diluting the resultant with one or more of the above-mentioned solvent so as to adjust the polymer content of the resultant to 15 to 30 weight percent.

As the polyurethane elastomer prepared according to the present method is in a form of a solution in a solvent such as tetrahydrofuran, cyclohexanone and dioxane, which is non-toxic to human body and has a low boiling point, it can easily be applied on fibrous materials by means of a simple procedure under heating at a rather low temperature without causing any degradation of the fibrous materials nor giving any harm to human body. Furthermore, a coating film prepared from the present elastomer on the surface of the fibrous materials has a high softening temperature, a high anti-coloring property and other excellent properties.

The polyester diols employable in this method are those which are prepared by reacting a dibasic carboxylic acid (e.g. adipic acid, succinic acid, sebacic acid, maleic acid, etc.) or its derivatives and a glycol (e.g. ethylene glycol, diethylene glycol, propylene glycol, butylene glycol, hexamethylene glycol, etc.) after a conventional manner (cf., e.g., "Polyesters and their Application" 3rd edition, April 1959, published by Bjorksten Research Lab., New York, U.S.A.) and those which are prepared by subjecting a lactone (e.g. $\delta$ - valerolactone, $\epsilon$ - caprolactone, methyl-$\epsilon$ - caprolactone, $\zeta$ - enantholactone, etc.) to an addition polymerization with a glycol (e.g. ethylene glycol, propylene glycol, butylene glycol, hexamethylene glycol, etc.) after a conventional manner (cf., e.g. U.S. Pats. 2,890,208, 2,977,885 and 2,933,478). Among these polyester diols, the use is advantageously made of those prepared from adipic acid on the one hand and a glycol on the other hand, particularly of polyethylene adipate and polybutylene adipate. As these polyesters, these having a molecular weight ranging from about 500 to about 1500, desirably about 500 to about 1000, are put into use. A polyurethane elastomer prepared according to the present method by using a polyester diol of molecular weight of higher than about 1500 or lower than about 500 gives only a coating film having a low softening temperature and other poor physical properties.

The compound of the above Formula I includes 1,3-cyclohexane diol, 1,4 - cyclohexane diol, 1,3 - bis(hydroxymethyl) - cyclohexane, 1,4 - bis(hydroxymethyl) - cyclohexane, 1,3 - bis(hydroxyethyl) - cyclohexane, and 1,4-bis(hydroxyethyl) - cyclohexane, and among them, 1,4-cyclohexane diol and 1,4 - bis(hydroxymethyl) - cyclohexane are desirably employed.

As the $\omega,\omega'$ - diisocyanate dimethylbenzene, any of m-isomer, p-isomer and a mixture thereof may be used. And a mixture of $\omega,\omega'$-diisocyanate dimethylbenzene and other diisocyanate such as diphenylmethane diisocyanate, naphthylene diisocyanate and the like can also be used in this method so far as the content of $\omega,\omega'$ diisocyanate dimethylbenzene in the mixture is not lower than about 80 weight percent.

The compound of the Formula I is used in an amount of 0.5 to 3 mole parts per mole of the polyester diol, particularly, when 1,3- or 1,4-cyclohexane diol is used, its amount is desirably 0.5 to 2 mole parts, and when 1,3- or 1,4 - bis(hydroxyalkyl) - cyclohexane is used, its amount is desirably 1 to 3 mole parts. If the compound of the Formula I is used in an amount of higher than about 3 mole parts, the resulting elastomer is hardly soluble in tetrahydrofuran, dioxane, cyclohexanone or mixtures thereof. While, if the compound of the Formula I is used in an amount of lower than about 0.5 mole part, the resulting elastomer gives only a coating film having a low softening temperature and other poor physical properties.

$\omega,\omega'$ - Diisocyanate dimethylbenzene is used in such an amount that a ratio of NCO groups in the diisocyonate to the total OH groups of the polyester diol and the compounds of the Formula I falls within a range of 0.95 to 1.10, preferably 1.00 to 1.05.

As the solvent, tetrahydrofuran or a mixture of tetrahydrofuran on one hand and dioxane, cyclohexanone, methylethyl ketone or methylacetate, on the other hand is desirably used. The tetrahydrofuran content in a mixture of tetrahydrofuran and dioxane is not lower than about 30 weight percent, and that in a mixture of tetrahydrofuran and cyclohexanone is not lower than about 30 weight percent.

Tetrahydrofuran, dioxane, cyclohexanone or a mixture of two or more thereof is used in such an amount that a weight ratio of the solvent to the reactants (the total of the polyester diol, the compound of the Formula I and $\omega,\omega'$ - diisocyanate dimethylbenzene) falls within a range of 40:60 to 70:30, desirably 45:55 to 60:40. When the amount of the solvent is over the above range, the resulting elastomer solution gives only a coating film having a low softening temperature and other poor physical properties, and adversely when the amount is below the above range, it is hardly possible to carry out the reaction to obtain the object elastomer in the form of a solution.

In the present method, the reactants are dissolved into tetrahydrofuran, dioxane, cyclohexanone or a mixture of two or more thereof in an optional order, and the solution is heated at a temperature ranging form about 40 to about 100° C. but lower than a boiling point of the solvent used, whereby the reaction is allowed to proceed. In this reaction, it is desirable to use phenyl-mercuric acetate, lead naphthenate or stannous octoate as a catalyst. Among the catalysts, phenylmercuric acetate is most desirable. An amount of the catalyst is about 0.001 to about 0.1 weight percent relative to the total weight of the reaction system (total of the reactants and the solvent). The reaction is allowed to continue until the resultant shows a viscosity of about 40,000 to about 300,000 cps. at the reaction temperature.

The resulting elastomer solution is then diluted with tetrahydrofuran, dioxane, cyclohexanone or a mixture of two or more thereof so as to adjust the polymer content to about 15 to about 30 weight percent.

Into the solution there may be incorporated pigments, dyestuffs, stabilizers, reinforcing materials, and other additives.

The elastomer solution prepared according to the present invention can be stored for a long period of time without causing precipitation of the polymer and can be used as a finishing agent for fibrous materials such as cloths, knitted-fabrics, non-woven fabrics, processed articles derived therefrom and the like. A fibrous material may be immersed into the solution, followed by drying, or the solution may be applied on a fibrous material, followed by drying, whereby a coating film is produced on the surface of the fibrous material.

In the following tests and examples, weight parts bear the same relations to volume parts as do grams to milliliters.

TEST 1

Varied mole parts of low molecular gylcol, 0.1 mole part of polyester diol and $\omega,\omega'$-diisocyanate dimethylbenzene (a mixture of 70 weight percent of m-isomer and 30 weight percent of p-isomer) in an amount to provide a ratio of NCO to OH of 1.02 are charged in an autoclave. Then added tetrahydrofuran in such a quantity as to provide a solution in which the concentration of the reacting materials is 50 weight percent. The mixture is heated at 60° C. under stirring in nitrogen gas stream for 8 hours. To the resultant is added 256 weight parts of tetrahydrofuran to make the polymer concentration into 25 weight percent. The mixed solution is then cooled to about 15° to 20° C. and kept at the temperature for more than a month, and its appearance is observed. The solution is applied on a plate followed by drying at about 60° C. Softening temperature and other physical properties of thus yielded film are measured. The result is described below.

of molecular weight of 900, 0.2 mole part of 1,4-cyclohexane diol and 0.306 mole part of ω,ω'-diisocyanate dimethylbenzene (a mixture of 70 weight percent of m-isomer 30 weight percent of p-isomer). The mtixure is heated at 60° C. under stirring nitrogen gas stream with or without using lead naphthenate. The resultant is diluted with tetrahydrofuran so as to adjust the polymer content to 20 to 25 weight percent. After cooling, the solution is applied on a plate and dried at about 60° C.

TABLE 1

| Polyester diol | Low molecular glycol | Molar ratio of the glycol to polyester diol | Appearance of the solution | Softening temperature (°C.) | 100% modulus (kg./cm.²) | 300% modulus (kg. cm.²) | Tensile strength (kg. cm.²) | Elongation (percent) |
|---|---|---|---|---|---|---|---|---|
| Polybutylene adipate M.W.:1,000 | 1,4-cyclohexane diol | 2.5 | X | | | | | |
| | | 2.0 | O | 160 | 52.6 | 117 | 435 | 330 |
| | | 0.5 | O | 140 | 25.3 | 50.0 | 320 | 700 |
| | | 0.3 | O | 90 | 15.0 | 30.5 | 260 | 850 |
| | 1,4-bis-(hydroxymethyl)-cyclohexane | 3.0 | O | 160 | 60.1 | 115 | 440 | 350 |
| | | 2.0 | O | 150 | 47.4 | 92.1 | 478 | 590 |
| | | 0.3 | O | 80 | 10.0 | 20.6 | 368 | 900 |
| | Hydrogenated bisphenol A | 2.0 | O | 90 | 17.5 | 24.0 | 76.5 | 550 |
| | | 0.5 | O | 80 | | | | |
| | | 0.3 | O | 80 | | | | |
| | 1,4-butylene glycol | 2.0 | X | | | | | |
| | | 0.5 | X | | | | | |
| | Diethylene glycol | 2.0 | O | 70 | 25.5 | 29.8 | 51.1 | 1,100 |
| Polybutylene adipate M.W.:500 | 1,4-cyclohexane diol | 4.0 | O | 180 | 130 | 255 | 363 | 410 |
| | | 3.0 | O | 150 | 75.0 | 60.2 | 348 | 475 |
| | | 0.5 | O | 140 | 54.6 | 105 | 400 | 810 |
| | 1,4-bis-(hydroxymethyl)-cyclohexane | 1.0 | O | 130 | 90.5 | 183 | 306 | 480 |
| | Hydrogenated bisphenol A | 1.0 | O | 90 | | | | |
| | | 0.5 | O | 70 | | | | |
| | 1,4-butylene glycol | 0.5 | X | | | | | |
| Polycaprolactone diol M.W.:1,000 | 1,4-cyclohexane diol | 4.0 | O | 165 | 54.0 | 121 | 450 | 410 |
| | 1,4-bis-(hydroxymethyl)-cyclohexane | 3.0 | O | 135 | 30.5 | 54.7 | 370 | 615 |
| Polycaproladtone diol M.W.:500 | 1,4-cyclohexane diol | 2.0 | O | 180 | 130 | 266 | 335 | 230 |
| Polyethylene adipate M.W.:1,000 | 1,4-bis-(hydroxymethyl)-cyclohexane | 2.0 | O | 150 | 41.9 | 77.4 | 355 | 660 |
| Polycaprolactone diol M.W.:4,000 | 1,4-cyclohexane diol | 4.0 | X | | | | | |
| | | 0.5 | X | | | | | |
| | 1,4-bis-(hydroxymethyl)-cyclohexane | 2.0 | X | | | | | |
| | | 0.5 | O | 120 | 10.0 | 12.7 | 255 | 820 |
| | Hydrogenated bisphenol A | 1.0 | X | 60 | 10.5 | 11.8 | 54.0 | 1,000 |
| | 1,4-butylene glycol | 0.5 | X | | | | | |
| Polybutylene adipate M.W.:2,000 | 1,4-cyclohexane diol | 2.0 | X | | | | | |
| | 1,4-bis-(hydroxymethyl)-cyclohexane | 2.0 | X | | | | | |
| | 1,4-butylene glycol | 1.0 | X | | | | | |
| | | 0.5 | X | | | | | |

NOTE: O=The solution is kept clear and transparent.
X=There are observed turbidity and/or precipitations, and homogeneous film is hardly produced.

TEST 2

An autoclave is charged with tetrahydrofuran, followed by the addition of 0.1 mole part of polybutylene adipate Physical propreties of thus yielded film are measured. The result is described below.

TABLE 2

| Test No. | Amount of tetrahydrofuran (THF)[1] | Amount of lead naphthenate (wt. percent) | Reaction time (hr.) | Amount of THF for diluting the resultant (wt. percent) | Resulting solution Viscosity (cps. at 25° C.) | Polymer content (wt. percent) | Softening temperature (°C.) | 100% modulus (kg./cm.²) | 300% modulus (kg./cm.²) | Tensile strength (kg./cm.²) | Elongation (percent) |
|---|---|---|---|---|---|---|---|---|---|---|---|
| 1 | 80 | 0 | 30 | 0 | 18 | 20 | A film cannot be formed. | | | | |
| 2 | 80 | 0.005 | 30 | 0 | 15 | 20 | A film cannot be formed. | | | | |
| 3 | 75 | 0 | 30 | 0 | 200 | 25 | 90 | 30.6 | 50.0 | 91 | 1,000 |
| 4 | 70 | 0 | 20 | 5 | 2,200 | 25 | 140 | 45.6 | 95.5 | 350 | 610 |
| 5 | 70 | 0.005 | 20 | 5 | 1,600 | 25 | 135 | 41.5 | 82.7 | 312 | 720 |
| 6 | 60 | 0 | 8 | 15 | 3,200 | 25 | 160 | 52.6 | 117 | 435 | 530 |
| 7 | 60 | 0.005 | 4 | 15 | 4,900 | 25 | 165 | 53.6 | 118 | 440 | 540 |
| 8 | 50 | 0 | 4 | 25 | 4,200 | 25 | 160 | 50.2 | 114 | 483 | 560 |
| 9 | 25 | 0 | | | It is hardly possible to continue the reaction. | | | | | | |

[1] THF Reactants + THF (wt. %).

EXAMPLE 1

An autoclave equipped with a thermometer, nitrogen gas inlet tube and reflux condenser is charged with 256 weight parts of tetrahydrofuran, followed by the addition of 90 weight parts of polybutylene adipate diol of molecular weight of 900, 23.2 weight parts of 1,4-cyclohexane diol and 57.5 parts of $\omega,\omega'$-diisocyanate-dimethylbenzene (a mixture of 70 weight percent of m-isomer and 30 weight percent of p-isomer).

The mixture is heated at 60° C. under stirring in nitrogen gas streams for 8 hours, whereupon a viscous solution is obtained. 256 weight parts of tetrahydrofuran is further added to the solution, which is then cooled.

The above procedure yields a clear thermoplastic polyurethane elastomer solution showing a viscosity of 3,200 cps. at 25° C. The solution is applied on a plate and dried at about 60° C. to produce a film. Thus obtained film shows the following physical properties.

100% modulus—52.6 kg./cm.$^2$
300% modulus—117 kg./cm.$^2$
Tensile strength—435 kg./cm.$^2$
Elongation—530%
Softening temperature—160° C.

The film does not yellow, nor does it suffer any significant reduction in strength on exposure to Fade-Ometer radiation for 150 hours.

EXAMPLE 2

An autoclave of the type described in Example 1 is charged with 177 weight parts of cyclohexanone, followed by the addition of 92 weight parts of polyethylene adipate diol of molecular weight of 920, 28.8 weight parts of 1,4-bis-(hydroxymethyl)-cyclohexane and 56.4 weight parts of the same $\omega,\omega'$-diisocyanate-dimethylbenzene as in Example 1. The mixture is allowed to react in nitrogen streams at 90° C. for 6 hours. After the reaction mixture is cooled, 354 weight parts of tetrahydrofuran is added so as to dilute the mixture. The above procedure yields a thermoplastic polyurethane elastomer solution of a viscosity of 15,000 cps. at 25° C.

A film attainable therefrom by the same manner as in Example 1 has the following physical properties.

100% modulus—41.9 kg./cm.$^2$
300% modulus—77.4 kg./cm.$^2$
Tensile strength—355 kg./cm.$^2$
Elongation—600%
Softening temperature—150° C.

The resistance to light (measured by the same manner as in Example 1) of this film is also excellent.

EXAMPLE 3

In 191 weight parts of tetrahydrofuran are dissolved 105 weight parts of polybutylene adipate diol of molecular weight of 1050, 28.8 weight parts of 1,4-bis-(hydroxymethyl)-cyclohexane and 57.5 weight parts of $\omega,\omega'$-diisocyanate-dimethylbenzene-(1,4), and the resulting mixed solution is allowed to react at 60° C. for 10 hours, at the end of which the mixture is diluted with a mixed solvent of 380 weight parts of tetrahydrofuran and 190 weight parts of dioxane. The above procedure yields a thermoplastic polyurethane elastomer solution of a viscosity of 1,700 cps. at 25° C.

This solution is further mixed with 4 weight parts of di-t-amylhydroquinone. The film formed therefrom by the same manner as in Example 1 shows the following physical properties:

100% modulus—47.2 kg./cm.$^2$
300% modulus—92.1 kg./cm.$^2$
Tensile strength—478 kg./cm.$^2$
Elongation—590%
Softening temperature—150° C.

The film does not yellow on Fade-Ometer exposure at 60° C. for 20 hours.

EXAMPLE 4

To 133 weight parts of cyclohexanone are added 80 weight parts of polybutylene adipate diol of molecular weight of 800, 14.4 weight parts of 1,4-bis-(hydroxymethyl)-cyclohexane and 38.9 weight parts of the same $\omega,\omega'$-diisocyanate-dimethylbenzene as in Example 1, and the mixture is allowed to react under stirring in dry nitrogen stream at 90° C. for 4 hours. After the reaction mixture is cooled, it is diluted with 133 weight parts of tetrahydrofuran and 133 weight parts of dioxane. The above procedure yields a thermoplastic polyurethane elastomer solution of a viscosity of 7,600 cps. at 25° C. The film obtained therefrom by the same manner as in Example 1 shows the following physical properties.

100% modulus—34.6 kg./cm.$^2$
300% modulus—75.6 kg./cm.$^2$
Tensile strength—393 kg./cm.$^2$
Elongation—600%
Softening temperature—130° C.

To 100 weight parts of the elastomer solution are added 0.5 weight parts of di-t-amylhydroquinone and 7 weight parts of titan white to prepare a white enamel. The film attained from this enamel by the same manner as in Example 1 is exposed to a Fade-Ometer at 60° C. for 200 hours. The result shows no yellowing, nor any reduction in physical properties.

EXAMPLE 5

To 85.6 weight parts of cycolhexanone are added 49.5 weight parts of polybutylene adipate diol of molecular weight of 1000, 10.8 weight parts of 1,4-dihydroxymethylcyclohexane, 21.6 weight parts of the same $\omega,\omega'$-diisocyanate-dimethylbenzene as in Example 1 and 3.2 weight parts of 4,4'-diphenylmethane diisocyanate, and the resulting mixture is allowed to react in dry nitrogen gas streams at 90° C. under vigorous stirring for 12 hours. The solution thus obtained is diluted with 85.6 weight parts of cyclohexanone and 85.6 weight parts of tetrahydrofuran. The procedure yields a thermoplastic polyurethane elastomer solution of a viscosity of 11,300 cps. at 25° C.

The film attained therefrom by the same manner as in Example 1 shows the following properties.

100% modulus—63.9 kg./cm.$^2$
300% modulus—122 kg./cm.$^2$
Tensile strength—470 kg./cm.$^2$
Elongation—650%
Softening temperature—164° C.

The film does not discolor on exposure to a Fade-Ometer at 60° C. for 150 hours.

EXAMPLE 6

An autoclave of the type described in Example 1 is charged with 177 weight parts of cyclohexanone, followed by the addition of 92 weight parts of polyethylene adipate diol of molecular weight of 920, 28.8 weight parts of 1,4-bis-(hydroxymethyl)-cyclohexane, 56.4 weight parts of the same $\omega,\omega'$-diisocyanate dimethylbenzene as in Example 1 and 0.035 weight part of lead naphthenate. The mixture is allowed to react in nitrogen stream at 90° C. for 2 hours. After the reaction mixture is cooled, 354 weight parts of tetrahydrofuran is added so as to dilute the mixture. The above procedure yields a thermoplastic polyurethane elastomer solution of a viscosity of 16000 cps. at 25° C.

A film attainable therefrom by the same manner as in Example 1 has the following physical properties:

100% modulus—42.0 kg./cm.$^2$
300% modulus—75.5 kg./cm.$^2$
Tensile strength—370 kg./cm.$^2$
Elongation—600%
Softening temperature—152° C.

The resistance to light (measured by the same manner as in Example 1) of this film is also excellent.

What we claim is:

1. A method for preparing a polyurethane elastomer solution, which comprises reacting (a) a polyester diol of molecular weight ranging from 500 to 1500; (b) a compound of the formula

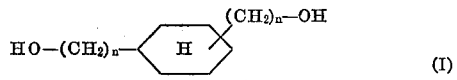

(I)

wherein $n$ is 0, 1 or 2, and the one HO—(CH$_2$)$_n$-group attaches to the cyclohexyl ring at para- or meta-position relative to the other HO—(CH$_2$)$_n$-group in an amount of 0.5 to 3 mole parts per mole of the polyester diol and (c) ω,ω'-diisocyanato dimethylbenzene in an amount of 0.475 to 0.55 mole per OH group in the combined polyester diol and the compound of formula (I) at a temperature between about 100° C. but lower than the boiling point of the solvent used in the presence of tetrahydrofuran, cyclohexanone, dioxane, methylethyl ketone, methyl acetate, or a mixture of two or more thereof in such an amount that a weight ratio of the solvent to the reactants falls within 40:60 to 70:30, and diluting the resultant solution with one or more of the above-mentioned solvents so as to adjust the polymer content to 15 to 30 weight percent.

2. A method claimed in claim 1, wherein 1,4-cyclohexane diol or 1,4-bis-(hydroxymethyl)-cyclohexane is used as the compound of the Formula I.

3. A method claimed in claim 1, wherein polybutylene adipate of molecular weight of 500 to 1500 is used as the polyester diol.

4. A method claimed in claim 1, wherein 1,4-cyclohexane diol is used as the compound of the Formula I in an amount of 0.5 to 2 mole parts per mole of the polyester diol.

5. A methd claimed in claim 1, wherein 1,4-bis-(hydroxymethyl)-cyclohexane is used as the compound of the Formula I in an amount of 1 to 3 mole parts per mole of the polyester diol.

6. The method of claim 1 wherein the reaction is conducted in the presence of phenylmercuric acetate, lead naphthenate or stannous octoate.

7. A composition produced by the method of claim 1.

References Cited

UNITED STATES PATENTS

| | | |
|---|---|---|
| 2,837,498 | 6/1958 | Ferstandig. |
| 3,428,609 | 2/1969 | Chilvers et al. |
| 3,436,361 | 4/1969 | Wooster. |
| 3,248,373 | 4/1966 | Barringer _____ 260—77.5 |
| 3,454,533 | 7/1969 | Kerrigan et al. _____ 260—75 |

DONALD E. CZAJA, Primary Examiner

H. S. COCKERAM, Assistant Examiner

U.S. Cl. X.R.

260—30.4, 31.2, 32.8, 75